United States Patent [19]
Justiniano et al.

[11] Patent Number: 6,126,296
[45] Date of Patent: *Oct. 3, 2000

[54] ADJUSTABLE CEILING AND WALL COVER PLATE

[75] Inventors: Joseph G. Justiniano, Bethpage; Stephen Stewart, Uniondale, both of N.Y.

[73] Assignee: Leviton Manufacturing Co., Inc., Little Neck, N.Y.

[ * ] Notice: This patent is subject to a terminal disclaimer.

[21] Appl. No.: 09/314,692

[22] Filed: May 19, 1999

Related U.S. Application Data

[63] Continuation of application No. 08/911,881, Aug. 15, 1997.
[51] Int. Cl.$^7$ .......................................................... F21S 1/02
[52] U.S. Cl. ............................................. 362/147; 362/404
[58] Field of Search ..................................... 362/146, 147, 362/451, 404, 457; 52/463; 248/906, 343

[56] References Cited

U.S. PATENT DOCUMENTS

| | | | |
|---|---|---|---|
| 5,549,266 | 8/1996 | Mitchell et al. | 248/205.1 |
| 5,927,844 | 7/1999 | Justiniano et al. | 362/147 |

*Primary Examiner*—Nimeshkumar D. Patel
*Assistant Examiner*—Todd Reed Hopper
*Attorney, Agent, or Firm*—Paul J. Sutton

[57] ABSTRACT

A cover plate for ceiling or wall mounted electrical devices which follows the contour of the surface of the ceiling or wall about such devices. A mounting plate which can be mounted to a suitable box in the ceiling or wall has two sets of tongues to engage locking members on the cover plate. The locking members are flexible tabs which establish notches therebetween to receive the tongues of the cover plate and thus fix the cover plate to the mounting plate. The two detent posts with their associated tongues are independently applied so that the cover plate can more nearly match the contour of the ceiling or wall.

14 Claims, 2 Drawing Sheets

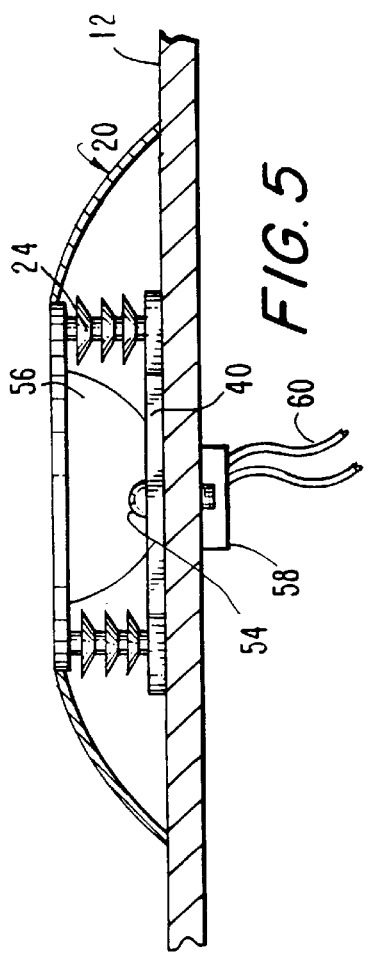
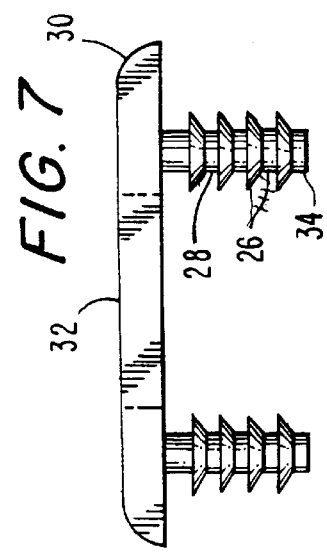
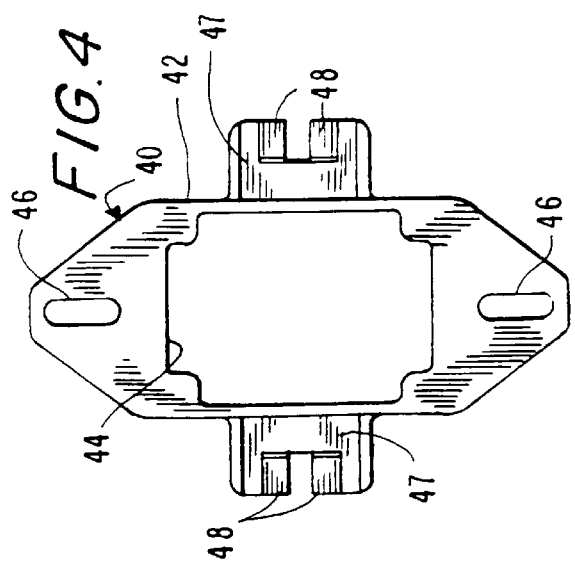
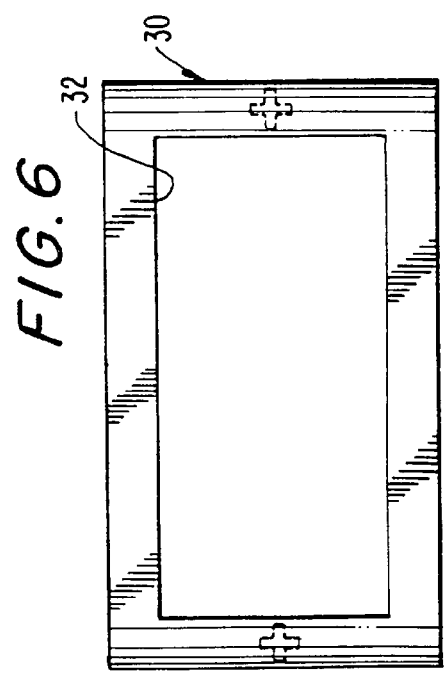

ADJUSTABLE CEILING AND WALL COVER PLATE

This application is continuation of application Ser. No. 08/911,881 filed Aug. 15, 1997.

BACKGROUND OF THE INVENTION

1. Field of the Invention

The invention is directed to cover plates which close the spaces between an electrical device and the wall or ceiling in which it is placed and more particularly to a cover plate which can be installed over an electrical device regardless of the planeness of the ceiling or wall surface.

2. Description of the Prior Art

The cover plates usually used in the prior art comprise metal or plastic plates having apertures through which the electrical device about which the cover plates are placed to extend through such cover plates. The cover plates can be round, square, rectangular or any other desired shape and have apertures through which the electrical device is at least partially visible. At least one screw and usually more screws are then used to fasten the cover plate over the electrical device and the gaps between the ceiling or wall material and the electrical device. If the ceiling or wall is not plane, one area of the cover plate is not flush with the ceiling or wall leaving an unsightly gap and a place where dirt, moisture or other debris can enter and interfere with the correct operation of the electrical device.

SUMMARY OF THE INVENTION

The cover plate constructed in accordance with the concepts of the invention contains two posts with a plurality of notches on at least two surfaces. The posts are made to engage with mating tabs on a mounting device and the cover plate can be inserted into the mating tabs to position the cover plate adjacent a ceiling or wall surface. Since each of the posts and mating tabs operate independently of other tabs and posts, the cover plate can be made to follow the contour of a non-plane ceiling or wall. It is an object of this invention to provide a novel adjustable cover plate.

It is an object of this invention to provide a novel adjustable cover plate which will follow the contours of a non-plane ceiling or wall.

It is yet another object of this invention to provide a novel adjustable cover plate having a plurality of adjustable steps by which the cover plate is positioned adjacent a ceiling or wall.

Other objects and features of the invention will be pointed out in the following description and claims and illustrated in the accompanying drawing, which disclose, by way of example, the principles of the invention, and the best mode presently contemplated for carrying them out.

BRIEF DESCRIPTION OF THE DRAWINGS

In the drawings in which similar elements are given similar reference characters:

FIG. 4 is a top plan view of the mounting plate for use with the cover plate of FIG. 2.

FIG. 5 is a side elevational view, partly in section, of the cover plate of FIG. 2 assembled to the mounting plate of FIG. 4, placed adjacent a ceiling panel.

FIG. 6 is a top plan view of a rectangular cover plate constructed in accordance with the concepts of the invention.

FIG. 7 is a side elevational view of the cover plate of FIG. 6.

DESCRIPTION OF THE PREFERRED EMBODIMENT

Figure 1:
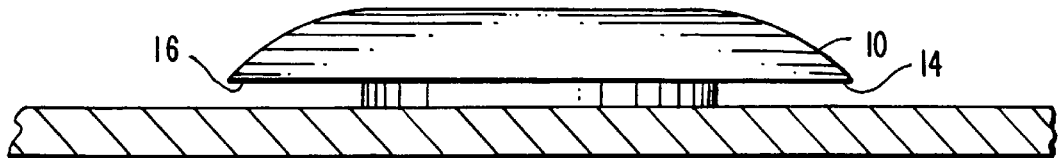
FIG. 1 is a side elevational view of a cover plate according to the prior art mounted to a ceiling panel shown in section.

FIG. 1 shows a prior art cover plate 10 installed over an aperture in a ceiling panel 12 (inverted). Based upon the position of the mounting plate (not shown) the cover plate 10 may not reach the ceiling panel 12 and (or may take a position which does not follow the contour of the ceiling panel). As shown end 14 of cover plate 10 is closer to ceiling panel 12 then end 16 leaving a gap at both ends.

Figure 2:
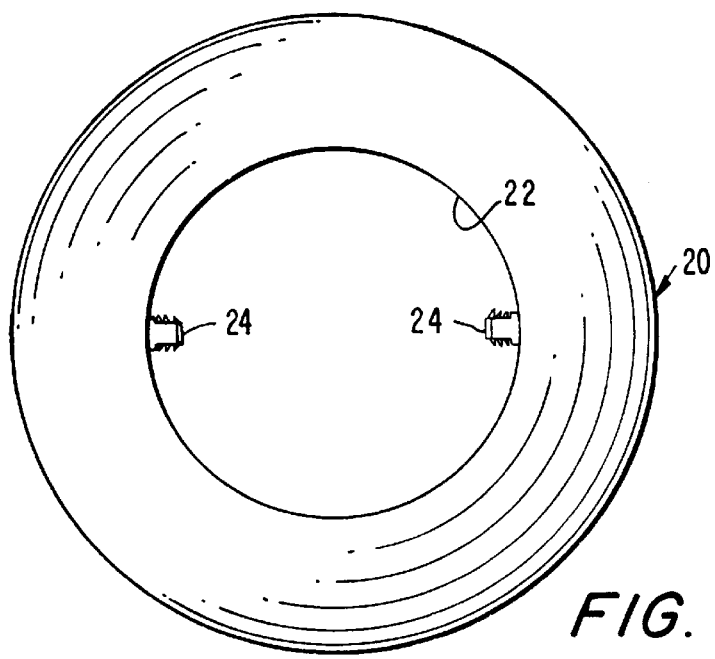
FIG. 2 is a top plan view of cover plate constructed in accordance with the concepts of the invention.
Figure 3:
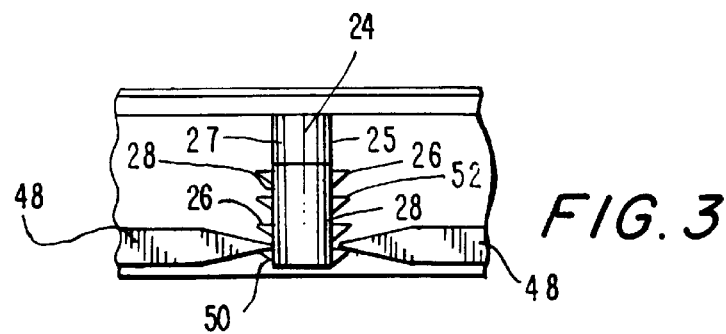
FIG. 3 is a fragmentary, enlarged, side elevational view showing a detent post and tabs used to fix the position of the cover plate.

Turning now to FIGS. 2 to 5 there is shown an adjustable cover plate 20 for ceilings or walls. Plate 20 is round and has a circular aperture 22 therein through which an electrical device such as an occupancy sensor (not shown) may project or through which access is available to an electrical device such as recessed receptacles (not shown). At diametrically opposed edges of the aperture 22 are detent posts 24 each of which has four flexible tabs 26 defining three notches 28. The flexible tabs 26 and the three notches 28 appear on all four sides of the detent posts 24. In FIG. 3, the flexible tabs 26 are only shown on sides 25 and 27 of detent post 24 for the sake of clarity. These notches receive locking tongues of the mounting plate to be described below. The number of flexible tabs 26 and the resulting notches can be increased or decreased as required. Further, the cover plate can be made in any desired shape, such as square or rectangular of shown by cover plate 30 in FIG. 6. In FIG. 2, the detent posts 24 extend into the aperture 22, but this is not the only position in which they can be placed. The detent posts 34 shown in FIGS. 6 and 7 are fully within the cover plate 20 and do not extend into the aperture 32 where they could possibly interfere with the electrical device installation or use. The detent posts 34 have the same arrangement of flexible tabs 26 and notches 28 as the cover plate 20.

FIG. 4 shows a mounting plate 40 which has an elongated body portion 42 which includes a central cut-out 44 and a mounting slot 46 at each end. The elongated body portion 42 can be placed over a gem gang box (not shown) and attached to the mounting ears of such box by fasteners inserted in slots 46. Wires and fittings can extend through cut-out 44 to be connected to an electrical device (not shown). Extending transverse to the longitudinal axis of body portion 42 are two extensions 47 with tongues 48 which engage two opposed sets of notches 28 on detent post 24 sides 25 and 27. As shown in FIG. 3, the detent post 24 has been inserted between the rigid tongues 48, and the lower tabs 26 on sides 25 and 27 have been deflected to permit the tongues 48 to take positions in notches 28. As the detent post 24 is forced downwardly toward the bottom of FIG. 3, the inclined front face 50 of tabs 26 cause the movement of the tab 26 closer to the side walls 25 and 27 of detent post 24. Once the tongues 48 are in place, adjacent rear face 52, the tabs 26 return to their original positions and the tongues occupy the lowest notch 28. The cover plate 20 is advanced along the detent posts 24 until the cover plate is flat against the mounting surface. The detent posts 24 may be inserted in the mounting plate 40 to different levels on opposite sides so that the cover plate 20 fits flush against the mounting surface as shown in FIG. 5.

To use the cover plate 20 of the instant invention, the mounting plate 40 is fixed to a gem gang box or the like by means of fasteners 54 (only one of which is shown in FIG. 5). The electrical device 56 is then installed to electrical conductors 60. The rear portion 58 of electrical device 56 extends through cut-out 44. Now the cover plate 20 is installed so that each of the two detent posts 24 are positioned in line with the tongues of one side of mounting plate 40 and the cover plate is depressed until the tongues 48 are seated in the correct notch 28. As stated above, the same notch 28 need not be engaged by each of the tongues 48, this permits the cover plate 20 to be positioned close to the mounting surface.

While there have been shown and described and pointed out the fundamental novel features of the invention as applied to the presently preferred embodiment, it will be understood that various omissions and substitutions and changes of the form and details of the devices illustrated and in their operation may be made by those skilled in the art, without departing from the spirit of the invention.

What is claimed is:

1. An adjustable ceiling and wall cover plate assembly comprising:
    a) a cover plate to cover at least a portion of an electrical device and at least a portion of the support surface about said electrical device, said cover plate having an aperture therein defined by an interior edge and extending from a first surface to a second surface;
    b) two detent posts at diametrically opposed locations on said cover plate and extending from said cover plate second surface and partially blocking said cover plate aperture, said two detent posts each having at least two notches on each of two opposite faces; and
    c) a mounting plate positionable on a support surface, said mounting plate having at least two sets of locking tongues, each set of locking tongues having two locking tongues to engage associated notches of one of said two detent posts whereby said cover plate can be assembled to said mounting plate with a portion of its second surface in contact with said support surface.

2. An adjustable ceiling and wall cover plate assembly, as defined in claim 1, wherein said notches on said detent posts are defined by adjacent flexible tabs.

3. An adjustable ceiling and wall cover plate assembly, as defined in claim 2, wherein said flexible tabs each have an inclined front surface and a rear surface perpendicular to the longitudinal axis of said detent posts, said front and rear surfaces meeting at a point, said flexible tabs being deflected by said locking tongues as said detent posts are advanced into said mounting plate and return to their initial positions once said tongues are adjacent said notches.

4. An adjustable ceiling and wall cover assembly, as defined in claim 1, wherein said cover plate is round.

5. An adjustable ceiling and wall cover assembly, as defined in claim 1, wherein said cover plate is rectangular.

6. An adjustable ceiling and wall cover assembly, as defined in claim 1, wherein said locking tongues are rigid.

7. An adjustable ceiling and wall cover plate assembly comprising:
    a) a cover plate to cover at least a portion of an electrical device and at least a portion of the support surface about said electrical device, said cover plate having an aperture therein defined by an edge and extending from a first surface to a second surface;
    b) two detent posts at diametrically opposed locations on said cover plate and extending from said cover plate second surface and partially blocking said cover plate aperture, said two detent posts each having at least two notches on each of four surfaces, said notches on said detent posts are defined by adjacent flexible tabs and said flexible tabs extend on all four surfaces of each of said two detent posts; and
    c) a mounting plate positionable on a support surface, said mounting plate having two sets of locking tongues, each set of locking tongues having two locking tongues to engage associated notches of one of said two detent posts whereby said cover plate can be assembled to said mounting plate with its second surface adjacent to said support surface.

8. An adjustable ceiling and wall cover plate assembly comprising:
    a) a cover plate to cover at least a portion of an electrical device and at least a portion of the support surface about said electrical device, said cover plate having an exterior edge and an aperture therein defined by an interior edge and extending from a first surface to a second surface;
    b) two detent posts at diametrically opposed locations on said cover plate and extending from said cover plate second surface between said interior edge and said exterior edge, said two detent posts each having at least two notches on each of two opposite faces; and
    c) a mounting plate positionable on a support surface, said mounting plate having at least two sets of locking tongues, each set of locking tongues having two locking tongues to engage associated notches of one of said two detent posts whereby said cover plate can be assembled to said mounting plate with a portion of its second surface in contact with said support surface.

9. An adjustable ceiling and wall cover plate assembly, as defined in claim 8, wherein said notches on said detent posts are defined by adjacent flexible tabs.

10. An adjustable ceiling and wall cover plate assembly, as defined in claim 9, wherein said flexible tabs each have an inclined front surface and a rear surface perpendicular to the longitudinal axis of said detent posts, said front and rear surfaces meeting at a point, said flexible tabs being deflected by said locking tongues as said detent posts are advanced into said mounting plate and return to their initial positions once said tongues are adjacent said notches.

11. An adjustable ceiling and wall cover assembly, as defined in claim 8, wherein said cover plate is round.

12. An adjustable ceiling and wall cover assembly, as defined in claim 8, wherein said cover plate is rectangular.

13. An adjustable ceiling and wall cover assembly, as defined in claim 8, wherein said locking tongues are rigid.

14. An adjustable ceiling and wall cover plate assembly comprising:
    a) a cover plate to cover at least a portion of an electrical device and at least a portion of the support surface about said electrical device, said cover plate having an exterior edge and an aperture therein defined by an interior edge and extending from a first surface to a second surface;
    b) two detent posts at diametrically opposed locations on said cover plate and extending from said cover plate second surface between said interior edge and said exterior edge, said two detent posts each having at least two notches on each of four surfaces, said notches on said detent posts are defined by adjacent flexible tabs and said flexible tabs extend on all four surfaces of each of said two detent posts; and c) a mounting plate positionable on a support surface, said mounting plate having at least two sets of locking tongues, each set of locking tongues having two locking tongues to engage associated notches of one of said two detent posts whereby said cover plate can be assembled to said mounting plate with a portion of its second surface in contact with said support surface.

* * * * *